US009026508B2

(12) United States Patent  
Nagai

(10) Patent No.: US 9,026,508 B2  
(45) Date of Patent: May 5, 2015

(54) DOCUMENT MANAGEMENT APPARATUS AND DOCUMENT MANAGEMENT METHOD USING SEARCH FOLDER COMPRISING ONE OR MORE PARENT FOLDERS

(75) Inventor: Hiroyuki Nagai, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 775 days.

(21) Appl. No.: 12/268,812

(22) Filed: Nov. 11, 2008

(65) Prior Publication Data

US 2009/0132497 A1 May 21, 2009

(30) Foreign Application Priority Data

Nov. 15, 2007 (JP) ................................. 2007-297202

(51) Int. Cl.
*G06F 7/00* (2006.01)
*G06F 17/00* (2006.01)
*G06F 17/30* (2006.01)

(52) U.S. Cl.
CPC ............................... *G06F 17/30011* (2013.01)

(58) Field of Classification Search
USPC ................................................. 707/694, 797
See application file for complete search history.

(56) References Cited

U.S. PATENT DOCUMENTS

| 6,141,662 | A | 10/2000 | Jeyachandran |
| 6,678,705 | B1* | 1/2004 | Berchtold et al. ..................... 1/1 |
| 7,386,530 | B2* | 6/2008 | Kiessig et al. ........................ 1/1 |
| 7,844,633 | B2* | 11/2010 | Miszczyk et al. ............. 707/797 |
| 2002/0133492 | A1* | 9/2002 | Goldstein et al. ............... 707/10 |
| 2003/0063326 | A1* | 4/2003 | Kiyono et al. ................ 358/440 |
| 2005/0216453 | A1* | 9/2005 | Sasaki et al. ....................... 707/3 |
| 2006/0167861 | A1* | 7/2006 | Arrouye et al. .................... 707/3 |
| 2007/0299867 | A1* | 12/2007 | Baldwin et al. ........... 707/103 R |
| 2008/0077571 | A1* | 3/2008 | Harris et al. ........................ 707/5 |
| 2009/0157628 | A1* | 6/2009 | Arthursson et al. .............. 707/3 |

FOREIGN PATENT DOCUMENTS

| JP | 10-269121 | 10/1998 |
| JP | 2000-057128 | 2/2000 |

* cited by examiner

*Primary Examiner* — Sherief Badawi
*Assistant Examiner* — Christopher J Raab
(74) *Attorney, Agent, or Firm* — Cowan, Liebowitz & Latman, P.C.

(57) ABSTRACT

A document management apparatus, which converts management of documents managed using a folder tree to management using search folders, newly defines attributes of documents included in respective hierarchies of the folder tree as a conversion source. To each document which belongs to the folder tree, a name of a folder in an upper hierarchy, which stores that document, is assigned as an attribute value of the defined attribute. Each folder which configures the folder tree is converted into a search folder which can search for documents assigned with the attribute values using the name of that folder as a search condition.

7 Claims, 15 Drawing Sheets

F I G. 5
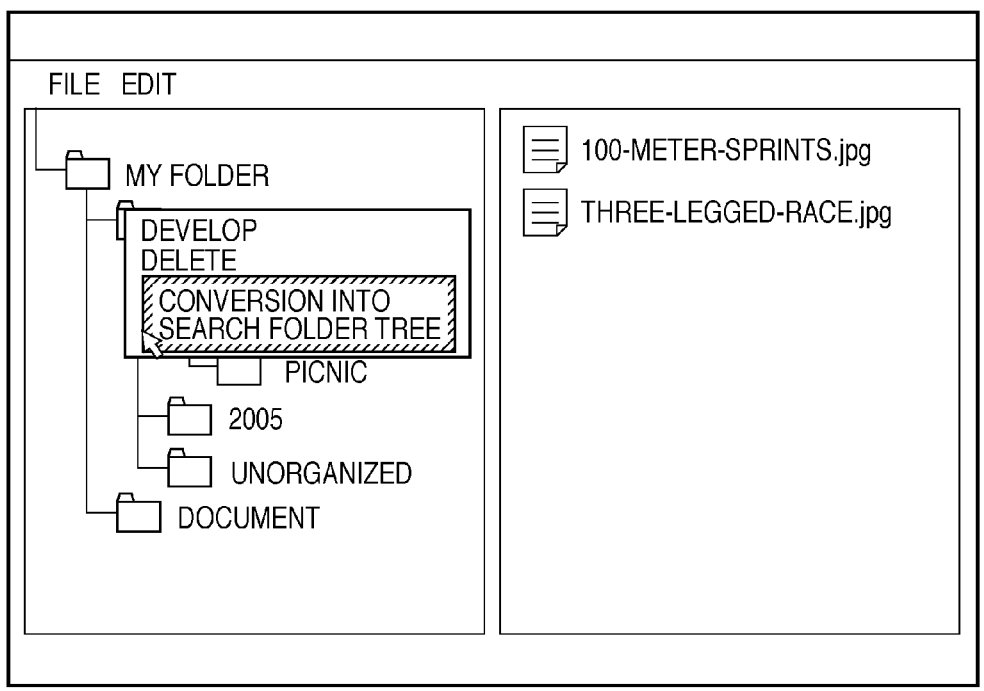

FIG. 13

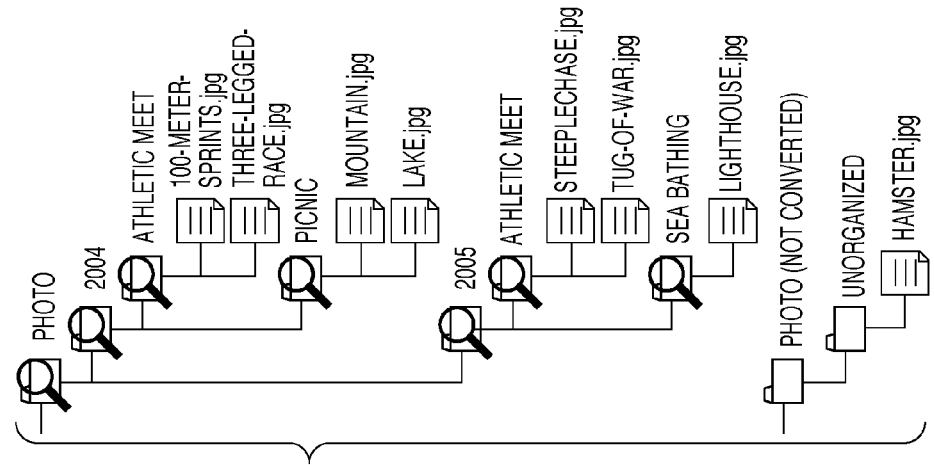

| NAME | SEARCH CONDITION | GENRE | CREATION DATE AND TIME | EVENT |
|---|---|---|---|---|
| PHOTO | GENRE = PHOTO | | | |
| 2004 | Year (CREATION DATE AND TIME) = 2004 | | | |
| ATHLETIC MEET | EVENT = ATHLETIC MEET | | | |
| 100-METER-SPRINTS.jpg | | PHOTO | 2004.05.10 09:45:11 | ATHLETIC MEET |
| THREE-LEGGED-RACE.jpg | | PHOTO | 2004.05.10 14:01:24 | ATHLETIC MEET |
| PICNIC | EVENT = PICNIC | | | |
| MOUNTAIN.jpg | | PHOTO | 2004.08.02 09:03:32 | PICNIC |
| LAKE.jpg | | PHOTO | 2004.08.02 11:45:01 | PICNIC |
| 2005 | Year (CREATION DATE AND TIME) = 2005 | | | |
| ATHLETIC MEET | EVENT = ATHLETIC MEET | | | |
| STEEPLECHASE.jpg | | PHOTO | 2005.05.08 10:01:20 | ATHLETIC MEET |
| TUG-OF-WAR.jpg | | PHOTO | 2005.05.08 13:51:44 | ATHLETIC MEET |
| SEA BATHING | EVENT = SEA BATHING | | | |
| LIGHTHOUSE.jpg | | PHOTO | 2005.07.29 15:19:00 | SEA BATHING |
| PHOTO (NOT CONVERTED) | | | | |
| UNORGANIZED | | | | |
| HAMSTER.jpg | | | | |

FIG. 14

REGISTRATION OF DOCUMENT

| ATTRIBUTE NAME | ATTRIBUTE VALUE |
|---|---|
| NAME | GRASS.jpg |
| CREATION DATE AND TIME | 2005.11.15 8:40:11 |
| SIZE | 1.5MB |
| GENRE | PHOTO |
| EVENT | TRIP |

1401

CANCEL  OK

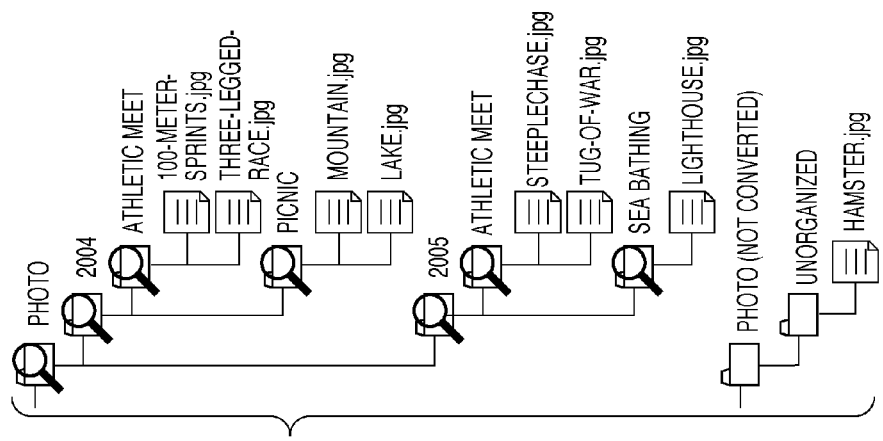

| NAME | SEARCH CONDITION | GENRE | CREATION DATE AND TIME | EVENT |
|---|---|---|---|---|
| PHOTO | | | | |
| 2004 | | | | |
| ATHLETIC MEET | GENRE = PHOTO AND Year (CREATION DATE AND TIME) = 2004 AND EVENT = ATHLETIC MEET | | | |
| 100-METER-SPRINTS.jpg | | PHOTO | 2004.05.10 09:45:11 | ATHLETIC MEET |
| THREE-LEGGED-RACE.jpg | | PHOTO | 2004.05.10 14:01:24 | ATHLETIC MEET |
| PICNIC | GENRE = PHOTO AND Year (CREATION DATE AND TIME) = 2004 AND EVENT = PICNIC | | | |
| MOUNTAIN.jpg | | PHOTO | 2004.08.02 09:03:32 | PICNIC |
| LAKE.jpg | | PHOTO | 2004.08.02 11:45:01 | PICNIC |
| 2005 | | | | |
| ATHLETIC MEET | GENRE = PHOTO AND Year (CREATION DATE AND TIME) = 2005 AND EVENT = ATHLETIC MEET | | | |
| STEEPLECHASE.jpg | | PHOTO | 2005.05.08 10:01:20 | ATHLETIC MEET |
| TUG-OF-WAR.jpg | | PHOTO | 2005.05.08 13:51:44 | ATHLETIC MEET |
| SEA BATHING | GENRE = PHOTO AND Year (CREATION DATE AND TIME) = 2005 AND EVENT = SEA BATHING | | | |
| LIGHTHOUSE.jpg | | PHOTO | 2005.07.29 15:19:00 | SEA BATHING |
| PHOTO (NOT CONVERTED) | | | | |
| UNORGANIZED | | | | |
| HAMSTER.jpg | | | | |

DOCUMENT MANAGEMENT APPARATUS AND DOCUMENT MANAGEMENT METHOD USING SEARCH FOLDER COMPRISING ONE OR MORE PARENT FOLDERS

BACKGROUND OF THE INVENTION

1. Field of the Invention

The present invention relates to a document management technique.

2. Description of the Related Art

Conventionally, upon managing digital documents, it is a common practice to classify and organize documents using a folder tree. (This conventional folder will be referred to as a "normal folder" hereinafter.) By allocating documents in a classification system having a tree structure, a document search is facilitated. There is only one classification system, and documents are classified to one space. However, it is difficult to classify documents using one classification system. In order to cope with searches with various intentions, it is preferable to associate documents with a plurality of classification systems. As a technique which implements this, a virtual folder technique is known. With the virtual folder technique, a plurality of folder trees are built using virtual folders, and documents can be allocated in these plurality of folder trees. A search folder as one type of virtual folders has a search condition used to specify documents, and can include documents that match the condition as folder elements (for example, see Japanese Patent Laid-Open No. 2000-057128). This technique has a merit of automatically allocating documents if the user does not explicitly allocate documents in folder trees. As the search condition, attribute information of documents is used. Upon execution of management using a search folder, how to assign this attribute information without any load on the user poses a problem, and for example, a technique using a folder name is available (for example, see Japanese Patent Laid-Open No. 10-269121).

However, upon making transition of documents which are conventionally managed using a normal folder tree to an environment that manages them using search folders, problems that cannot be solved by the aforementioned technique alone still remain. That is, problems, for example, how to give a search condition of each search folder and how to use information classified using hierarchies in the normal folder tree upon making the transition, still remain unsolved.

SUMMARY OF THE INVENTION

It is an object of the present invention to provide a document management technique which allows transition of documents managed using a normal folder tree and the folder tree to a management environment using search folders.

According to one aspect of the present invention, there is provided a document management apparatus, which converts management of documents managed using a folder tree to management using search folders, comprising:

a document attribute definition unit adapted to newly define attributes of documents included in respective hierarchies of the folder tree as a conversion source;

a document attribute value assignment unit adapted to assign, to each document which belongs to the folder tree, a name of a folder in an upper hierarchy, which stores that document, as an attribute value of the attribute defined by the document attribute definition unit; and a folder conversion unit adapted to convert each folder which configures the folder tree into a search folder which can search for documents assigned with the attribute values using the name of that folder as a search condition.

According to another aspect of the present invention, there is provided a document management method, which converts management of documents managed using a folder tree to management using search folders, comprising:

a document attribute definition step of controlling a document attribute definition unit to newly define attributes of documents included in respective hierarchies of the folder tree as a conversion source;

a document attribute value assignment step of controlling a document attribute value assignment unit to assign, to each document which belongs to the folder tree, a name of a folder in an upper hierarchy, which stores that document, as an attribute value of the attribute defined in the document attribute definition step; and a folder conversion step of controlling a folder conversion unit to convert each folder which configures the folder tree into a search folder which can search for documents assigned with the attribute values using the name of that folder as a search condition.

According to the present invention, documents managed using normal folders and a folder tree can be easily transited to a management environment using search folders.

Further features of the present invention will become apparent from the following description of exemplary embodiments with reference to the attached drawings.

BRIEF DESCRIPTION OF THE DRAWINGS

FIG. 5 is a view showing an example of an operation window used to request folder conversion processing;

FIG. 13 is a view showing search conditions of search folders after conversion, and attributes and attribute values of documents, which have been changed by conversion;

FIG. 14 is a view showing an example of a document registration window; and

FIG. 15 is a view showing search conditions of search folders after conversion, and attributes and attribute values of documents, which have been changed by conversion in the first embodiment.

DESCRIPTION OF THE EMBODIMENTS

Preferred embodiments of the present invention will be exemplarily described in detail hereinafter with reference to the accompanying drawings. Note that components described in these embodiments are merely examples, and the technical scope of the present invention is settled by the scope of claims and is not limited to each individual embodiment.

<First Embodiment>

Figure 1:
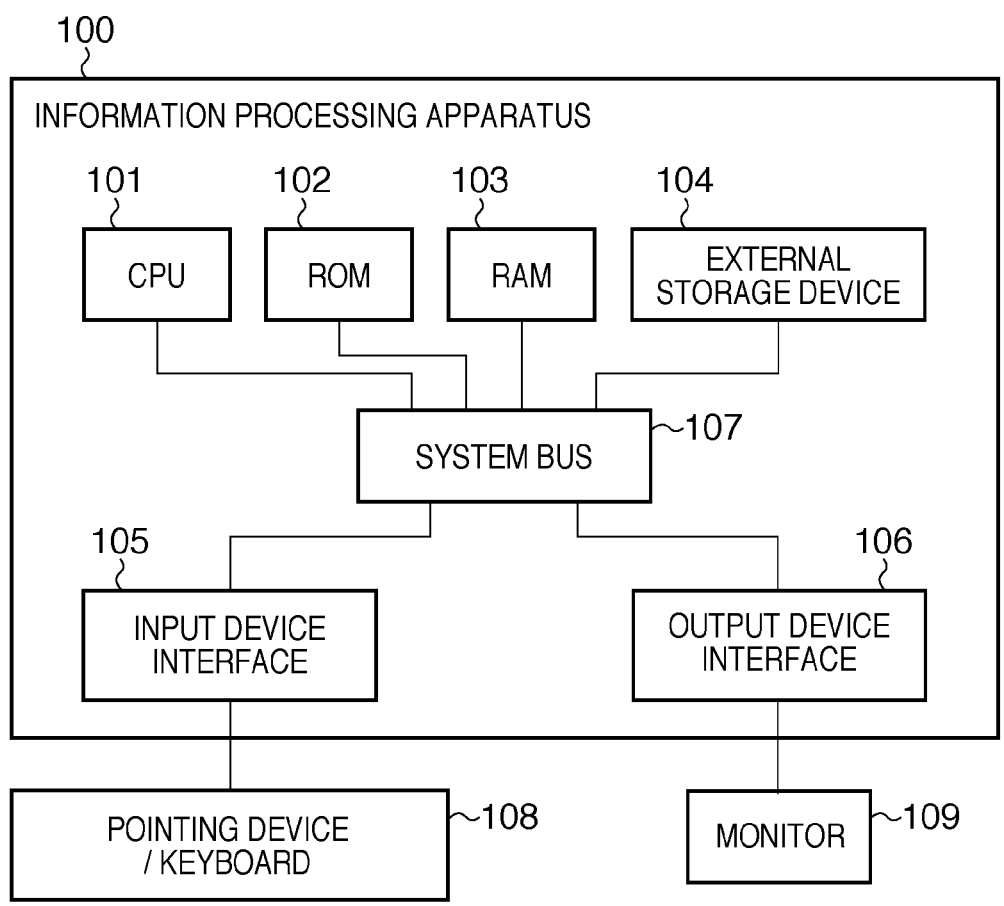
FIG. 1 is a block diagram showing the arrangement of an information processing apparatus according to an embodiment.

The arrangement of an information processing apparatus 100 of this embodiment will be described below with reference to the block diagram of FIG. 1. Reference numeral 101 denotes a Central Processing Unit (CPU) which controls the overall information processing apparatus 100. Reference numeral 102 denotes a Read Only Memory (ROM) which stores programs and parameters which need not be changed. Reference numeral 103 denotes a Random Access Memory (RAM) which temporarily stores programs and data supplied from an external device or the like. An external storage device 104 includes a hard disk or memory card, which is fixedly equipped in the information processing apparatus 100. Or the external storage device 104 includes an optical disk such as a Flexible Disk (FD), Compact Disc (CD), or the like, a magnetic or optical card, an IC card, a memory card, or the like, which is detachable from the information processing apparatus 100. Reference numeral 105 denotes an interface with an input device such as a pointing device/keyboard 108, or the like, which inputs data in response to a user's operations. Reference numeral 106 denotes an interface with a monitor 109 which displays data held by the information processing apparatus 100 and supplied data. Reference numeral 107 denotes a system bus which connects the units 101 to 106 to be able to communicate with each other.

In this embodiment, a document management program including the contents of the present invention is stored in the external storage device 104, and is executed by the CPU 101. The user operates using the pointing device/keyboard 108 and obtains a response from the monitor 109. The document management program may be stored in the ROM 102.

Figure 2:
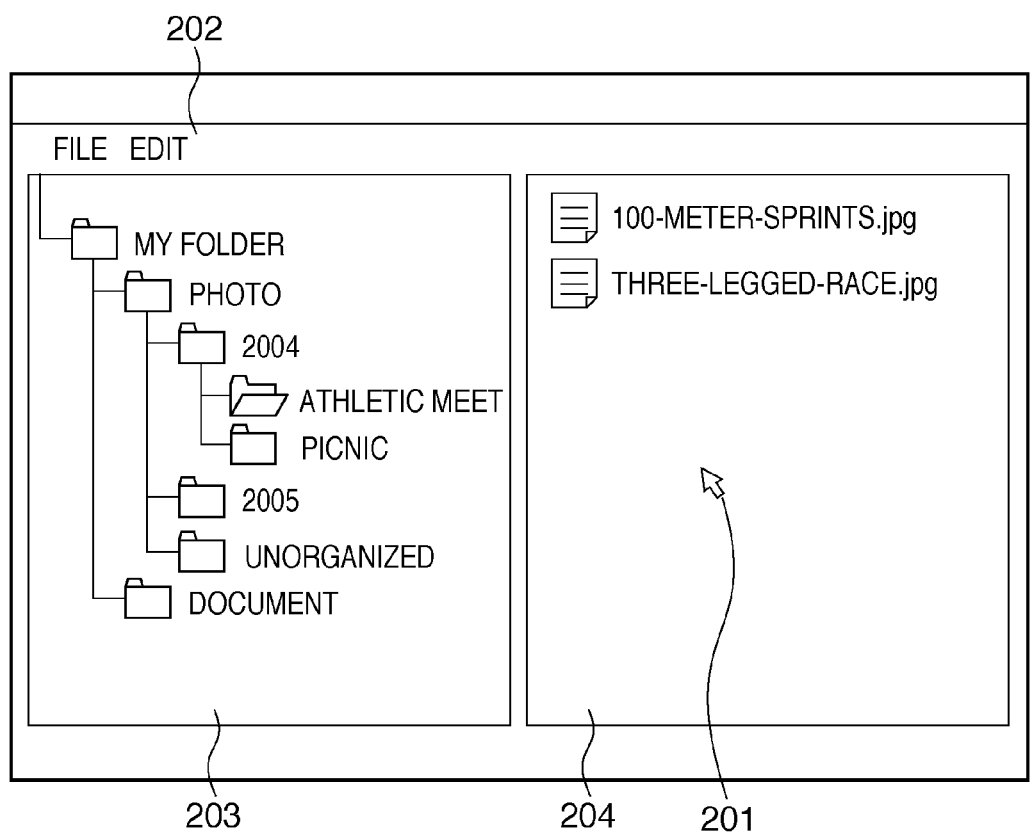
FIG. 2 is a view showing an example of a document management window.

FIG. 2 shows a document management window output to the monitor 109. Reference numeral 201 denotes a mouse cursor. The user inputs an instruction to the document management program by operating this mouse cursor 201 using a mouse as one type of the pointing device/keyboard 108. Reference numeral 202 denotes an operation menu. The user instructs an operation that he or she wants to make for documents and folders from this operation menu 202. Reference numeral 203 denotes a tree view which displays a tree structure of folders. Folders are expressed by their icons and names, and the tree structure is expressed by the layout of folder icons and lines connecting these icons. The user can also input an instruction to documents and folders by operations on this tree view. Reference numeral 204 denotes a list view which displays folder elements of the designated folder. The user designates a folder on the tree view 203. Documents and folders as folder elements are expressed by their icons and names. The user can also input an instruction for documents and folders by operations on this list view.

Instructions that can be input to the document management program include creation, deletion, and correction of contents of search folders, those of documents, import/export of documents and folders from an external apparatus or external program, and the like. A conversion method from a normal folder tree into a search folder tree is implemented as one of contents correction processes of normal folders and documents, and also as one of import processes of documents and folders from the external apparatus or external program.

Figure 3:
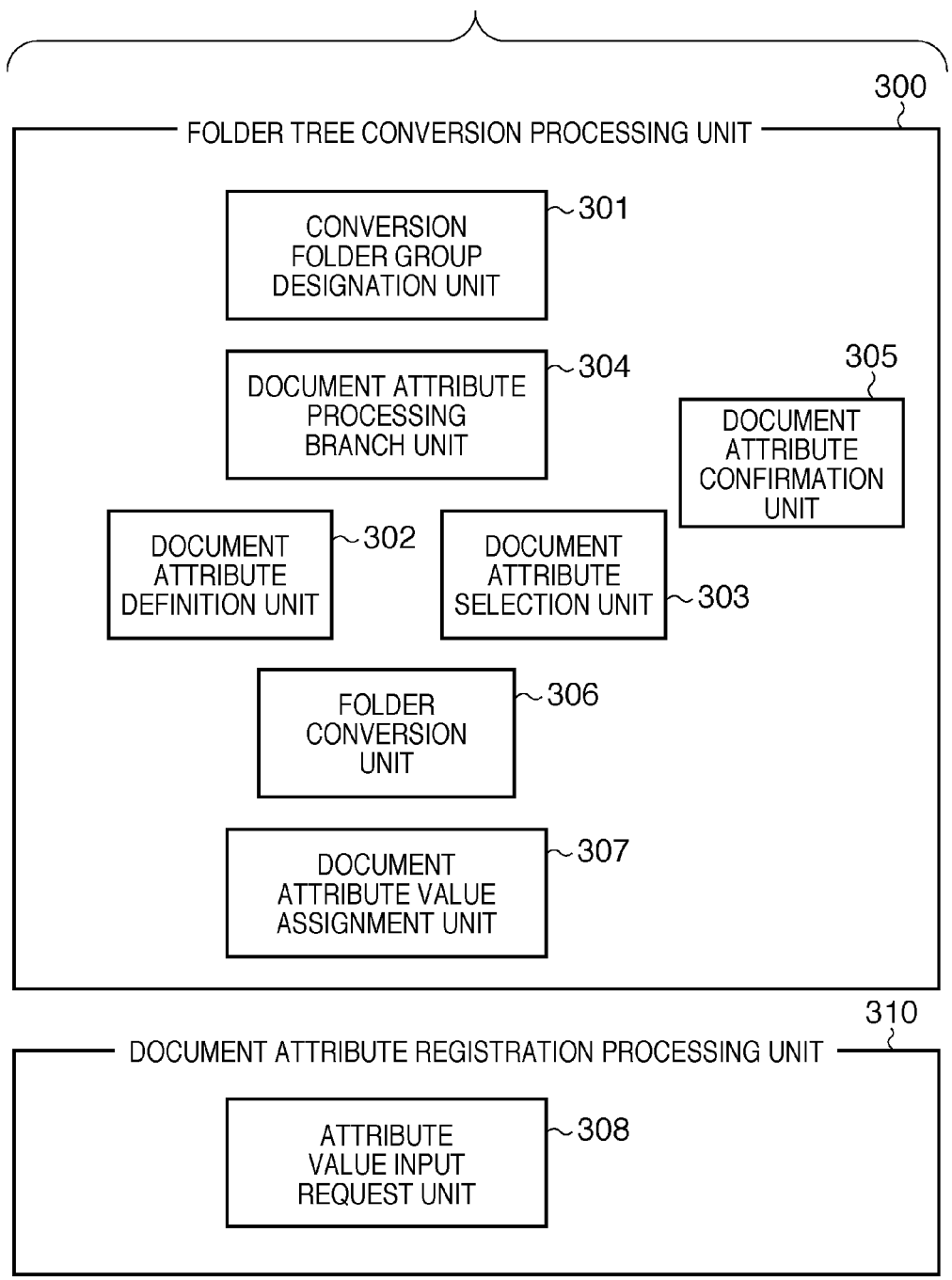
FIG. 3 is a diagram for explaining the functional arrangement required to execute folder tree conversion processing and document attribute registration processing.

FIG. 3 is a block diagram showing the functional arrangements of a folder tree conversion processing unit 300 and document attribute registration processing unit 310, which are implemented by the CPU 101 and programs of the information processing apparatus. Reference numerals 301 to 307 denote function modules of the folder tree conversion processing unit 300. Reference numeral 308 denotes a function module of the document attribute registration processing unit 310. Respective components will be briefly described below, and their details will be described later.

A conversion folder group designation unit 301 requests the user to designate a normal folder/document group to be converted, and accepts a user's instruction.

A document attribute definition unit 302 executes processing for defining a new document attribute upon converting the normal folder/document group.

A document attribute selection unit 303 executes processing for using an existing document attribute upon converting the normal folder/document group.

A document attribute processing branch unit 304 executes processing for prompting the user to select whether a new document attribute is defined based on the processing of the document attribute definition unit 302 or an existing document attribute is used based on the processing of the document attribute selection unit 303.

A document attribute confirmation unit 305 executes processing for checking attributes which are selectable by the document attribute selection unit 303 of the existing attributes.

A folder conversion unit 306 executes processing for converting normal folders into search folders.

A document attribute value assignment unit 307 executes processing for assigning attribute values specified by the document attribute definition unit 302 and document attribute selection unit 303 to documents to be converted.

An attribute value input request unit 308 prompts the user to assign attribute values of attributes registered by the document attribute definition unit 302 when a new document is registered, when an external document is imported, and when attributes of an existing document are changed.

Figure 4:
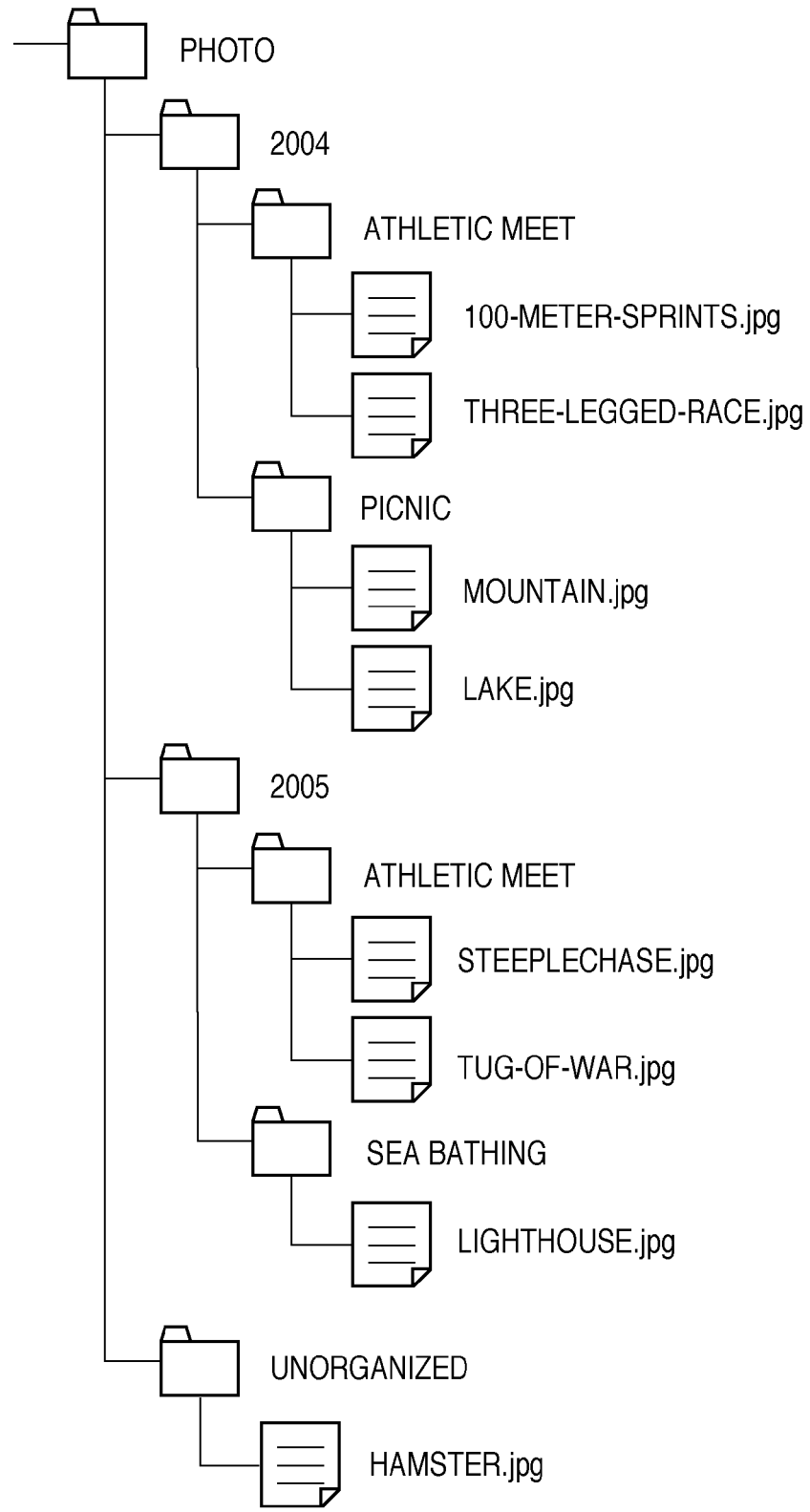
FIG. 4 is a view showing an example of the contents of a folder tree.

FIG. 4 is a view showing the contents of a folder tree used as an example in the following detailed description of the folder tree conversion processing. This folder tree is a sub tree of a folder tree managed by the document management program. An uppermost folder of this sub tree is a folder with a name "photo". (In the following description, a specific folder in the example is indicated by preposing its name. The same applies to documents. For example, a folder to be indicated will be described as a "photo" folder.) The "photo" folder includes, as its folder elements, three folders, i.e., a "2004" folder, "2005" folder, and "unorganized" folder. The "2004" folder includes, as its folder elements, two folders, i.e., an "athletic meet" folder and "picnic" folder. The "2005" folder includes, as its folder elements, two folders, i.e., an "athletic meet" folder and "sea bathing" folder. The "athletic meet" folder under the "2004" folder includes, as its folder elements, a "100-meter-sprints.jpg" document and "three-legged-race.jpg" document. The "picnic" folder includes, as its folder elements, two documents, i.e., a "mountain.jpg" document and "lake.jpg" document. The "athletic meet" folder under the "2005" folder includes, as its folder elements, two documents, i.e., a "steeplechase.jpg" document and "tug-of-war.jpg" document. The "sea bathing" folder includes, as its folder element, a "lighthouse.jpg" document. The "unorganized" folder includes, as its folder element, a "hamster.jpg" document.

Figure 6:
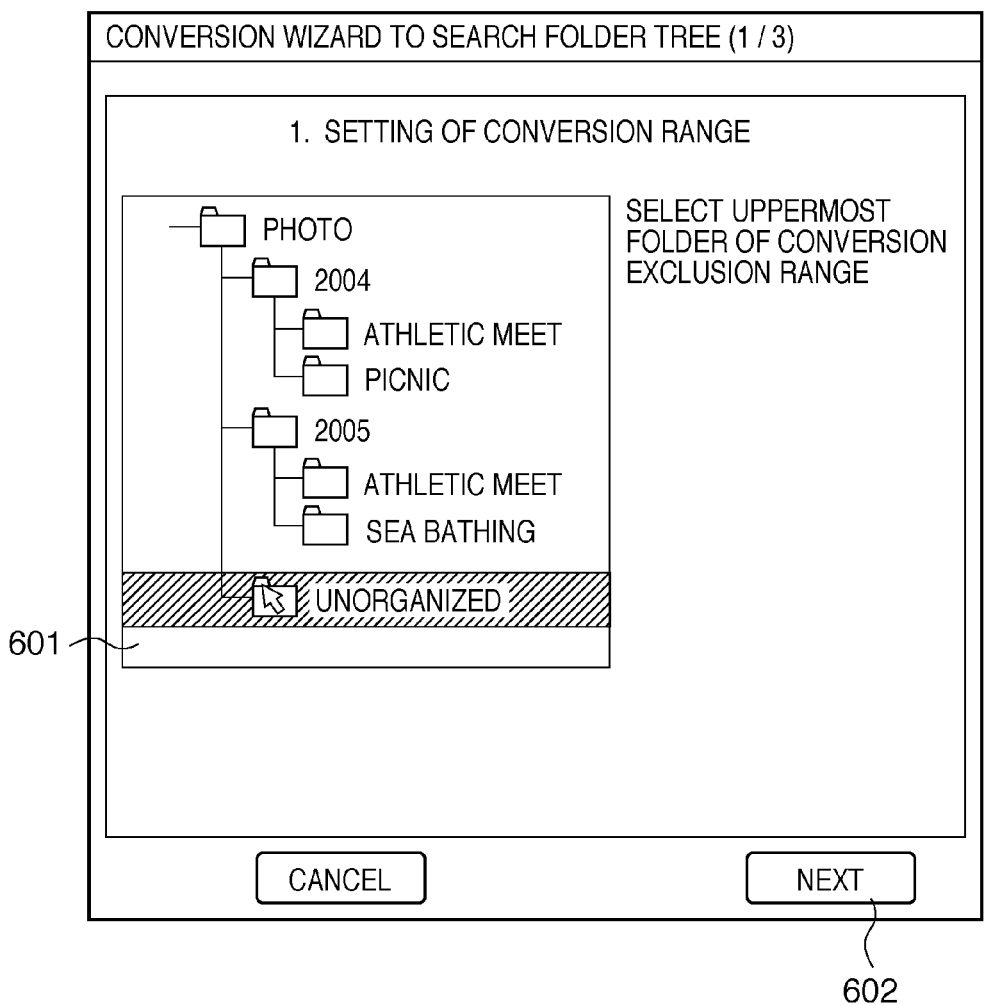
FIG. 6 is a view showing an example of a conversion range setting window.

FIG. 5 shows a window when the user selects the "photo" folder on the tree view 203 of the document management window, and makes an operation to request folder conversion processing. With this instruction, the document management program starts folder tree conversion processing. FIG. 6 shows a folder tree conversion wizard window newly displayed on the monitor 109 in response to a user's operation in FIG. 5. The folder tree conversion wizard window is an operation window which prompts the user to sequentially input information required for the conversion processing. FIG. 6 shows the start window (first window) of the wizard, which requests the user to designate a conversion range. This conversion processing converts a folder tree which undergoes document classification/organization in a general folder tree that classifies identical hierarchies of a folder tree as different items of an identical classification granularity. However, that classification is often not thoroughly done in practice. For example, the "unorganized" folder in FIG. 4 is not classified based on the same classification system as the "2004" and "2005" folders in an identical hierarchy. The window that requests the user to make a designation to remove such folder from the conversion range is FIG. 6. An area 601 displays a folder tree as a conversion source. Upon selection of a folder, a sub folder free under that folder is excluded from the conversion range. In the conversion of the example of FIG. 4, the user designates the "unorganized" folder to exclude it from the conversion range, and then presses a button 602 to advance the conversion step.

Figure 7:
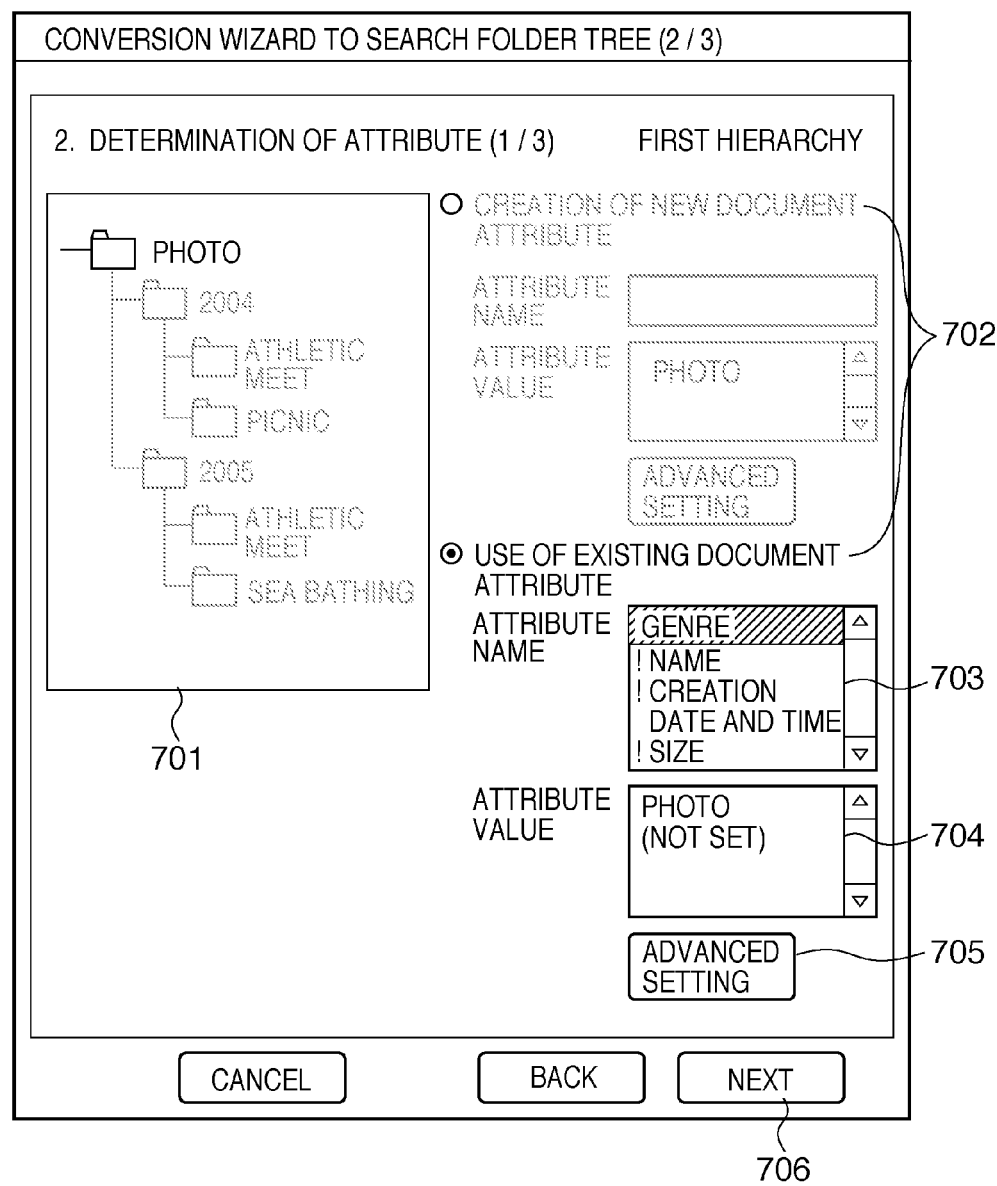
FIG. 7 is a view showing an example of an attribute determination window of the first hierarchy.

FIG. 7 shows the second window of the folder tree conversion wizard window. This window is displayed upon pressing of the button 602. FIGS. 7, 8, 10, and 11 show windows used to determine document attributes corresponding to respective hierarchies of the folder tree as the conversion source. FIG. 7 shows a window used to determine a document attribute for the first hierarchy. An area 701 displays the folder tree as the conversion source, and the "photo" folder as a target folder of the first hierarchy is highlighted. Reference numeral 702 denotes buttons used to select whether to create a new document attribute corresponding to the first hierarchy or to use an existing document attribute. On this window, the user selects either one of these buttons, and then makes further detailed settings. Detailed settings upon selection of creation of a new document attribute will be described later with reference to FIG. 11. When the user selects use of an existing document attribute, he or she selects a document attribute to be used from a list of attribute names of existing document attributes displayed in a box 703. Upon selection of a document attribute from the box 703, a box 704 displays a list of attribute values of the document attribute selected from the box 703, which are assigned to a document group that belongs to the folder tree as the conversion source. When attribute values are not set for all documents in the folder tree, a message indicating that a folder name is assigned as an attribute value is displayed.

A warning mark "!" displayed before an attribute name in the box 703 indicates that a problem may occur in conversion when that document attribute is used. That is, a problem is posed unless classification based on folders in a target hierarchy matches that based on attribute values of all documents under each folder (including not only those immediately under that folder but also those in a lowermost hierarchy of the conversion target range). In the first hierarchy, documents under the highlighted folder are all documents that belong to the folder tree. Hence, only an attribute for which all these documents have an identical attribute value or do not have any attribute values is an attribute which does not pose any problem when it is used in the conversion.

In case of FIG. 7, since the values of an attribute "genre" of all the documents are not set, it is a usable attribute. By contrast, since "name", "creation date and time", and "size" attributes do not assume identical attribute values in all the documents, the warning marks "!" are displayed. The second hierarchy includes two folders, that is, the "2004" and "2005" folders. No warning mark is displayed only for an attribute for which that attribute of all documents under the "2004" folder has the same value and that of all documents under the "2005" folder has the same value. When an attribute with the warning mark is used intact, the following determination is required to make. That is, determination as to whether an attribute value with the highest frequency of use of document attribute values under each folder is used or all attribute values are permitted (a search condition of a search folder after conversion is defined by a logical OR of respective attribute values) is required. When use of an attribute value with the highest frequency of use is selected, documents which do not have that attribute value cease to be included in a search folder tree after conversion.

Reference numeral 705 denotes a button used to call a setting window for making advanced settings that allow use of attributes with the warning marks. The advanced settings will be described later at the time of determination of an attribute of the second hierarchy. In the example of FIG. 7, the user selects an existing "genre" attribute for the first hierarchy and presses a button 706, thus advancing to an attribute setting window of the second hierarchy in FIG. 8.

Figure 8:
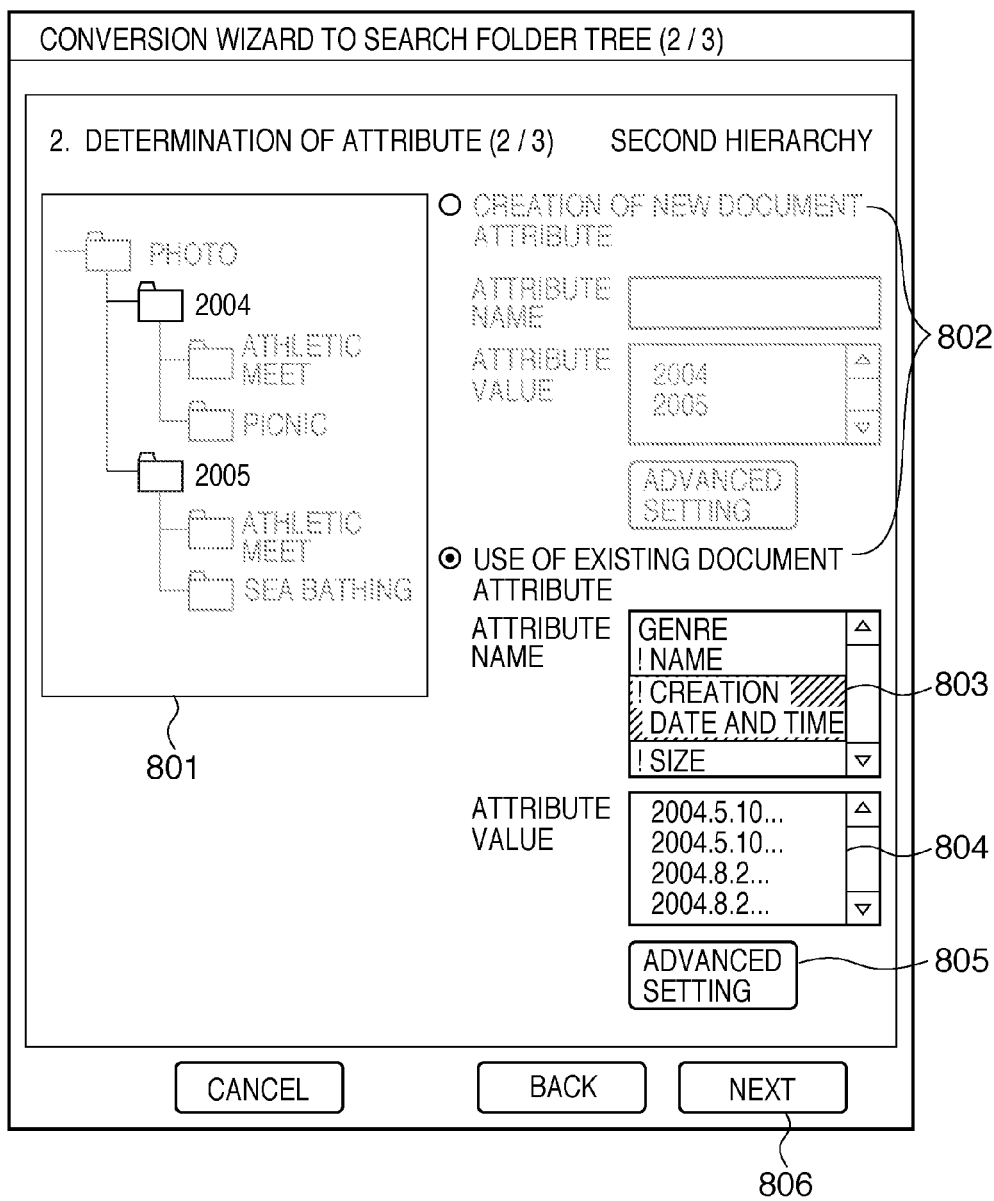
FIG. 8 is a view showing an example of an attribute determination window of the second hierarchy.

FIG. 8 shows the window used to set a document attribute corresponding to the second hierarchy. The window in FIG. 8 is basically the same as that in FIG. 7 except for a target hierarchy. An area 801 corresponds to the area 701 in FIG. 7, and highlights the "2004" and "2005" folders as those in the second hierarchy. Reference numeral 802 denotes buttons which correspond to the buttons 702 in FIG. 7 and are used to select whether to create a new document attribute or to use an existing document attribute. In this example, the user selects use of an existing attribute. A box 803 corresponds to the box 703 in FIG. 7, and displays a list of attribute names. In this example, the user selects a "creation date and time" attribute. A box 804 corresponds to the box 704 in FIG. 7, and displays a list of attribute values of the "creation date and time" attribute. In the box 803, the warning mark is displayed for the "creation date and time" attribute. This is because the "creation date and time" attribute assumes unique attribute values under the "2004" folder, but it does not assume unique attribute values under the "2005" folder. The "creation date and time" attribute is a time attribute having accuracy up to seconds, and respective documents have different attribute values in this example. In order to use this "creation date and time" attribute, the user presses a button 805 corresponding to the button 705 in FIG. 7 to make the advanced settings. Upon pressing of a button 806, the control advances to the next window.

Figure 9:
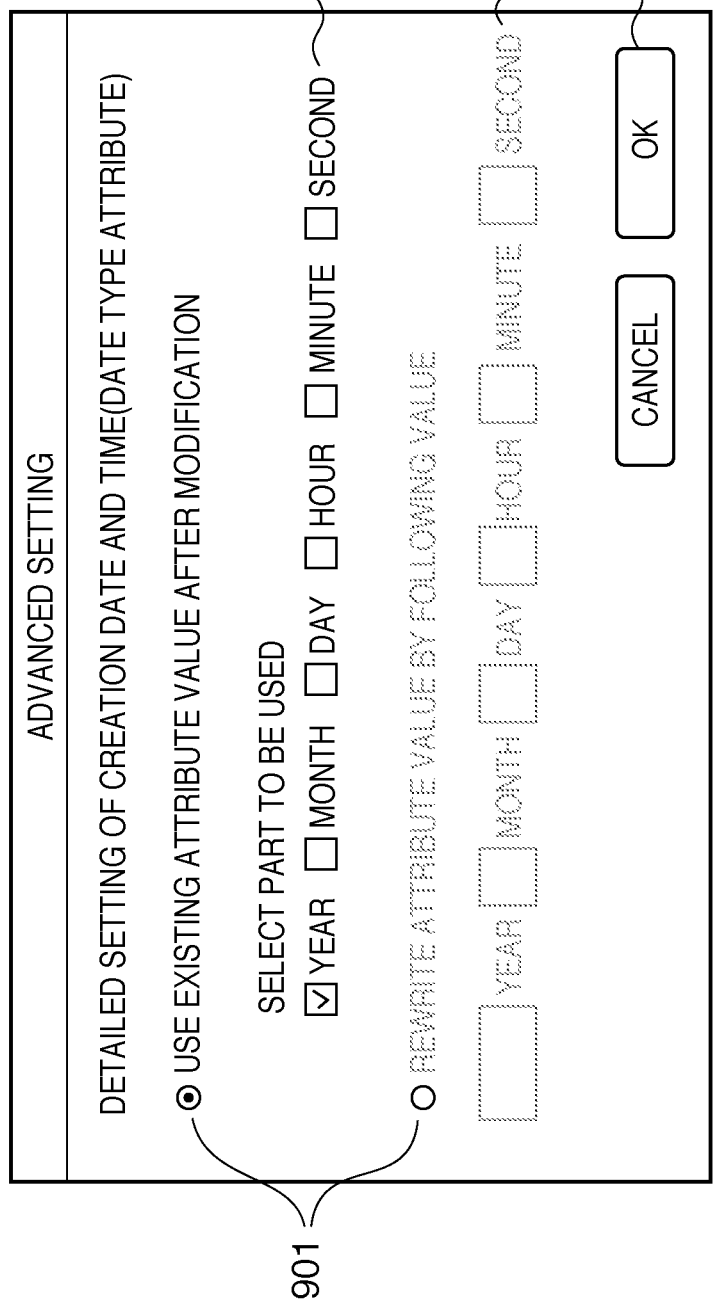
FIG. 9 is a view showing an example of an advanced setting window for an existing attribute.

FIG. 9 shows an advanced setting window displayed upon pressing of the button 805. Since the user presses the button 805 after he or she selects the "creation date and time" attribute in the box 803, settings associated with "creation date and time" are displayed. Since the "creation date and time" attribute is a date type attribute, this window allows to make a setting that uses information such as "year", "month", or the like that can be extracted from an attribute value in classification. Also, this window allows to make a setting that permits use of the "creation date and time" attribute by standardizing existing attribute values by an identical value. Reference numeral 901 denotes buttons used to select whether to use an existing attribute value after modification or to standardize attribute values by a given value. Reference numeral 902 denotes check boxes used to select a part to be used upon selection of use of an existing attribute value after modification using the button 901. Reference numeral 903 denotes fields used to input a value to be standardized upon selection of standardization of an attribute value by the button 901. In this example, the user selects modification of an existing attribute value, checks a "year" part, and presses an OK button 904, thus returning to the setting window in FIG. 8. Different advanced setting windows appear depending on the types of attributes selected in the box 803. In case of a character string type attribute, a regular expression input field that allows the user to designate a part to be used of a character string and its modification method using a regular expression when an existing attribute value is used is displayed. In case of a numeric type attribute, a window used to designate a numerical value range to be identified when an existing attribute value is used is displayed.

Figure 10:
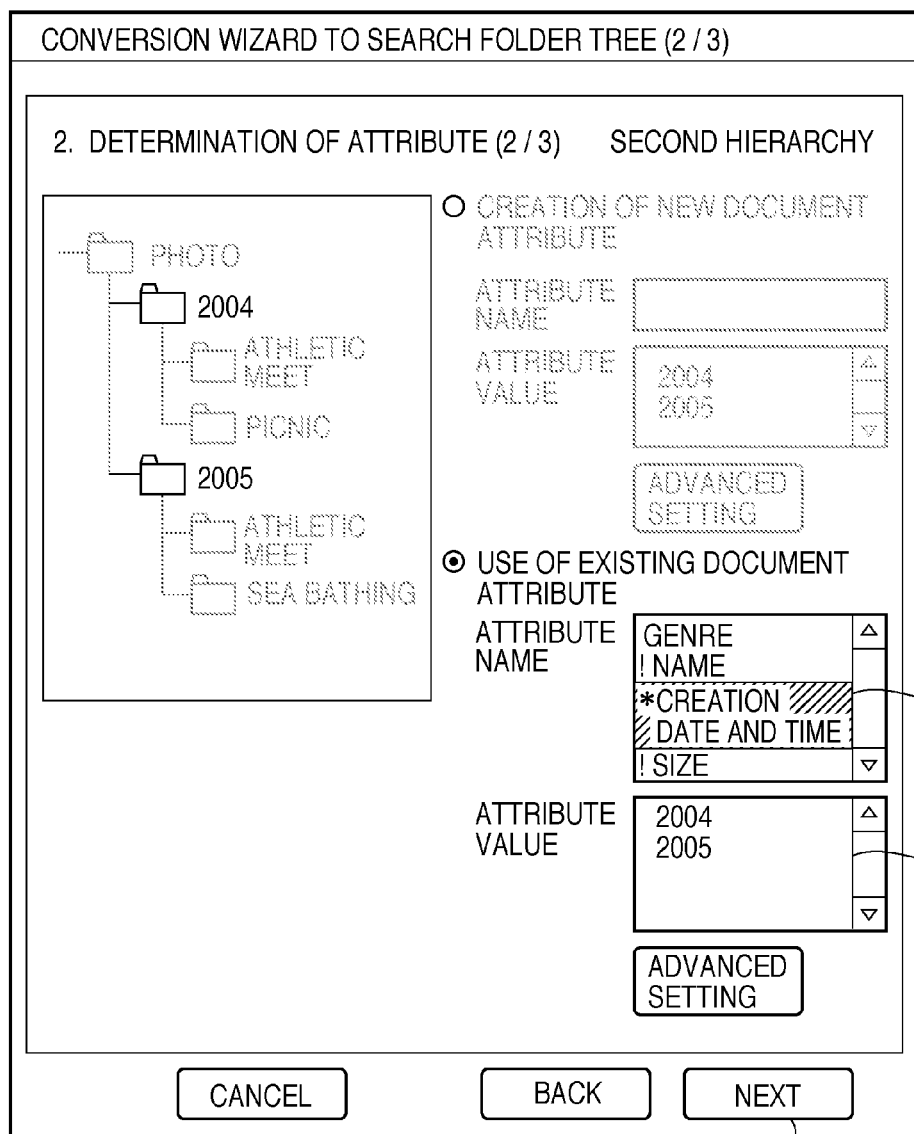
FIG. 10 is a view showing an example of the attribute determination window of the second hierarchy after the advanced setting.

FIG. 10 shows the window of FIG. 8 which is displayed again after the setting in FIG. 9. The contents in the boxes 803 and 804 have changed, as shown in boxes 1003 and 1004. In the box 1003, the warning mark of the "creation date and time" attribute is changed to a warning cancel mark "*". This mark indicates that the "creation date and time" attribute is usable as a result of the setting made on the window in FIG. 9. This indicates that upon checking only a "year" part of the "creation date and time" attribute of documents under the "2004" folder, all the documents have an identical value "2004", and upon checking only a "year" part of the "creation date and time" attribute of documents under the "2005" folder, all the documents have an identical value "2005". The box 1004 displays these two attribute values. In case of the above example, the user presses a button 1006 after the aforementioned setting, thus transiting to an attribute setting window of the third hierarchy in FIG. 11.

Figure 11:
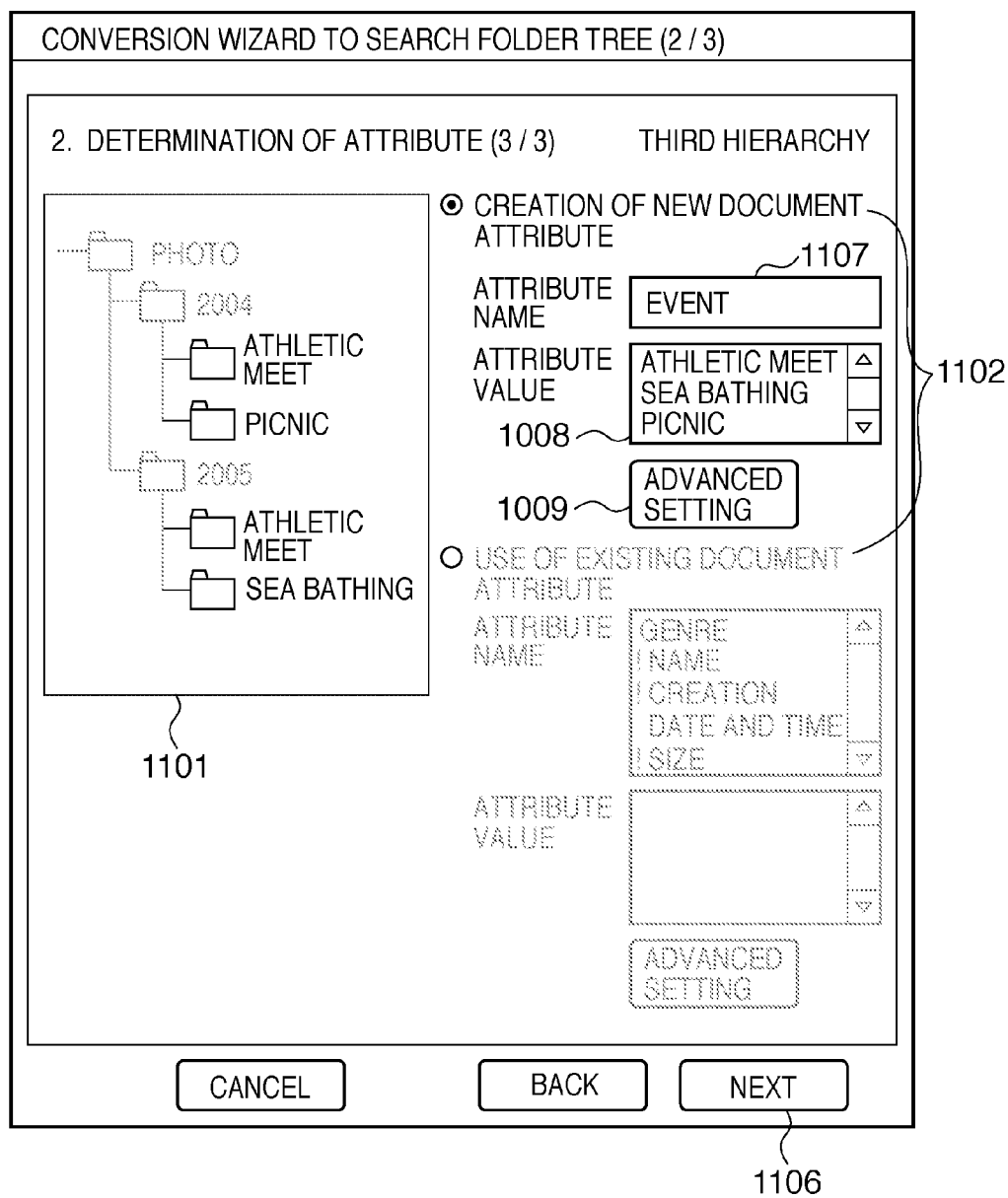
FIG. 11 is a view showing an example of an attribute determination window of the third hierarchy.

FIG. 11 shows a window used to set a document attribute corresponding to the third hierarchy. The window in FIG. 11 is basically the same as that in FIG. 7, except for a target hierarchy. An area 1101 corresponds to the area 701, and highlights the "athletic meet" folder and "picnic" folder under the "2004" folder, and the "athletic meet" folder and "sea bathing" folder under the "2005" folder, as folders in the third hierarchy. Reference numeral 1102 denotes buttons which correspond to the buttons 702 in FIG. 7 and are used to select whether to create a new document attribute or to use an existing document attribute. In this example, the user selects creation of a new document attribute. Reference numeral 1107 denotes a field used to input a name of a document attribute to be created. In this example, assume that the user inputs "event". Reference numeral 1108 denotes a list of attribute values to be assigned to documents. This is also a list of names of folders which belong to the current hierarchy, the attribute of which is to be determined, that is, the third hierarchy in the example. To documents under the folders of the third hierarchy, names of folders which store these documents are assigned as attribute values of an "event" attribute. Reference numeral 1109 denotes a button used to call an advanced setting window used when the names of folders are used after modification as attribute values to be assigned in place of using these names intact. On the advanced setting window, the user designates a type of attribute, and how to modify an original character string. In this example, no advanced setting is used. Upon completion of the aforementioned setting, the user presses a button 1106, thus transiting to a final setting window shown in FIG. 12.

Figure 12:
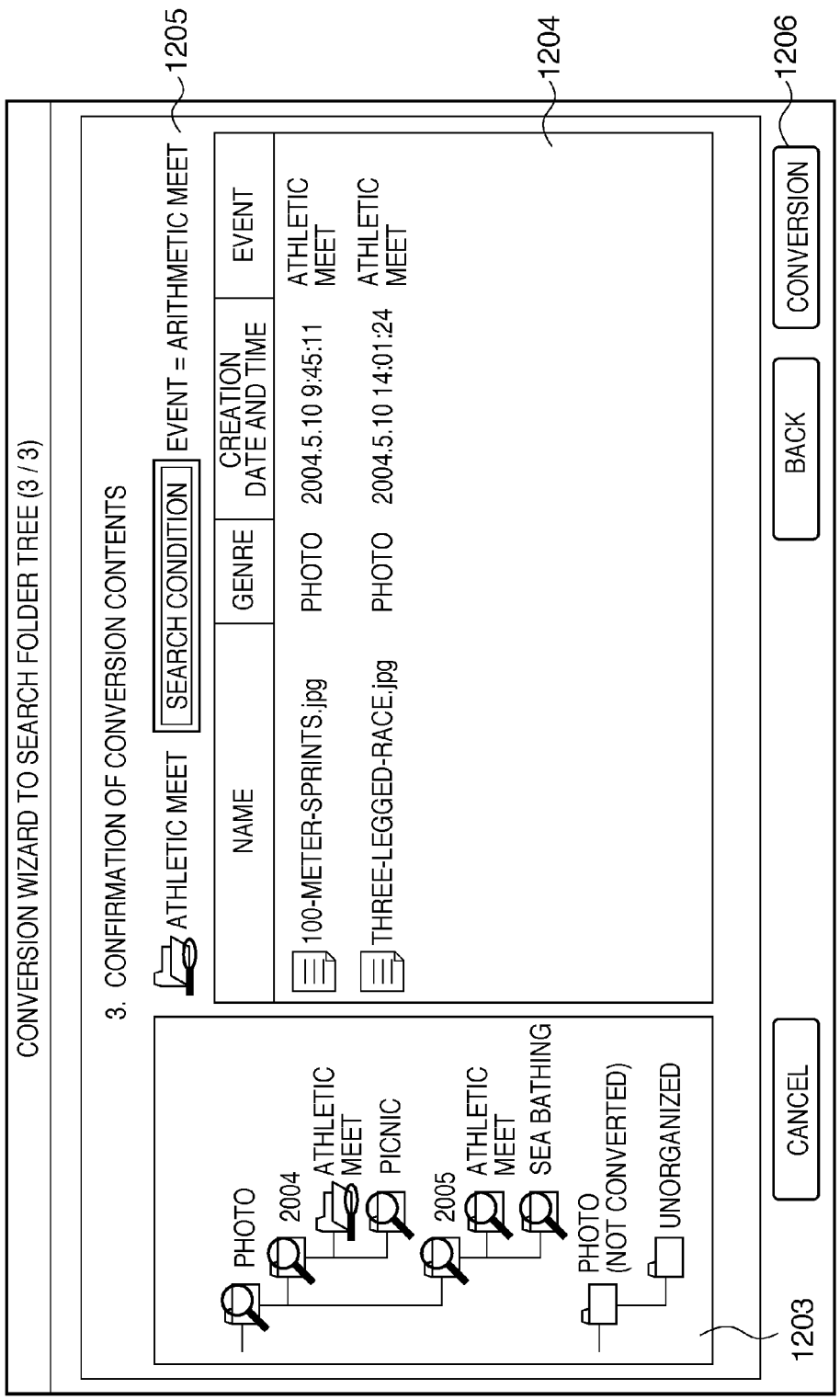
FIG. 12 is a view showing an example of a confirmation window of the conversion contents.

FIG. 12 shows a preview window which allows the user to confirm how the folder tree changes after conversion. The display contents and operations of this preview window are basically the same as those on the document management window shown in FIG. 2, except that only a search folder tree after conversion is displayed, and document operations cannot be made. Reference numeral 1203 denotes a tree view which corresponds to the tree view 203 and displays a folder tree structure. The folder tree having the same structure as that of the conversion source is displayed, but respective folders are converted into search folders. If there is a folder which is excluded from the conversion range upon setting the conversion range, a tree including only that excluded folder is formed as a folder tree having the same structure as the conversion source. If there is a document which is included in the folder tree before conversion but ceases to be included in the folder tree after conversion, its document information also ceases to be displayed. A document ceases to be included when an attribute with the warning mark of existing attributes is used upon determining an attribute corresponding to each hierarchy. Reference numeral 1204 denotes a list view which corresponds to the list view 204 and displays folder elements of the designated folder. The user designates a folder on the tree view 1203. The list view displays document names and values of attributes associated with the conversion. In this example, the list view displays values of a "genre" attribute as that corresponding to the first hierarchy of the folder tree, a "creation date and time" attribute as that corresponding to the second hierarchy, and an "event" attribute corresponding to the third hierarchy. Reference numeral 1205 denotes an area which displays a search condition of a search folder selected on the tree view 1203. When the user confirms these display contents, and is satisfied with the contents, he or she presses a button 1206 to start actual conversion.

FIG. 13 is a view showing search conditions of search folders after conversion, and attributes and attribute values of documents, which have been changed by the conversion. A search condition "Year (creation data and time)=2004" of the "2004" folder is a search condition to search for folders and documents, whose year of the creation date and time is "2004". A "genre" attribute is an existing attribute, but attribute values of respective documents are assigned by the conversion. As for the creation dates and times, both the attribute and attribute values remain the same. These attribute values are described since they are used in search conditions of search folders. An "event" attribute is newly defined, and its attribute values are newly assigned. When a parent folder of a given search folder is also a search folder, that given folder searches documents narrowed down by the search condition of the parent folder. That is, a search condition as a logical AND of search conditions of search folders in upper hierarchies is applied to a search folder of a lower hierarchy. For example, a search condition of the "sea bathing" folder is "event=sea bathing". Also, a search condition applied to the "sea bathing" folder is "genre=photo and Year (creation date and time)=2005 and event=sea bathing" since those of the "photo" folder and "2005" folder in the upper hierarchies are added. When search folders form a hierarchical structure, if a document matches a search condition of a search folder of a lower hierarchy, it does not become a direct element of a search folder of an upper hierarchy. For example, the "mountain.jpg" document matches the search conditions of both the "photo" folder and "2004" folder, but it matches the search condition of the "picnic" folder in their lower hierarchy. Hence, the "mountain.jpg" document does not appear immediately under the "photo" folder and "2004" folder.

The conversion folder group designation unit 301 obtains a folder group to be converted from the sub folder tree designated in FIG. 5 and the conversion exclusion range designated in FIG. 6. The conversion folder group designation unit 301 designates a partial configuration of the folder tree as a conversion target. The document attribute processing branch unit 304 uses one of the corresponding document attribute definition unit 302 and document attribute selection unit 303 in response to the selections at the buttons 702, 802, and 1102. When creation of a new document attribute is selected by the buttons 702, 802, and 1102, the document attribute definition unit 302 defines a document attribute using an attribute name given in the field 1107. When use of an existing document attribute is selected by the buttons 702, 802, and 1102, the document attribute selection unit 303 holds document attributes selected from the boxes 703, 803, and 1003. The document attribute confirmation unit 305 checks values of an existing attribute and confirms if that attribute can be used as that for documents to be stored in a search folder (whether or not that attribute is selectable), and its confirmation result is displayed using the warning mark (!) in the boxes 703 and 803 and the warning cancel mark (*) in the box 1003. Upon pressing of the button 1206, the folder conversion unit 306 generates search folders which correspond to respective conversion source folders designated by the conversion folder group designation unit 301 and each of which has a search condition in which an attribute determined by the document attribute definition unit 302 or document attribute selection unit 303 is an attribute value. Also, the document attribute value assignment unit 307 assigns an attribute value determined by the document attribute definition unit 302 or document attribute selection unit 303 to a document.

FIG. 14 shows a document registration window which is displayed upon instructing the document management program to manage a new document stored in the external storage device 104. Reference numeral 1401 denotes an area in which attribute values of a document are set. The area 1401 displays registered document attributes, and corresponding attribute values are set. The attribute values recorded in the external storage device 104 are set in advance as initial values after conversion. In this way, initial values are set in advance for those of "name", "creation date and time", and "size" attributes. Since FIG. 14 shows the registration window upon registering a document after conversion of the folder tree used in the above description, an "event attribute" defined by the conversion of the folder tree is displayed. As for "genre" and "event" attributes, attribute values assigned as those of an already managed document group are displayed as lists, and the user can select attribute values from these lists or can input new values. When the user selects an existing attribute value, that document exists under a search folder whose search condition matches that document. For example, as shown in FIG. 14, the user sets the attribute values of a "grass.jpg" document to be "creation date and time=2005.11.15 8:40: 11", "genre=photo", and "event=trip". When the user presses a registration execution button 1402, that document is registered, and "grass.jpg" exists under the "2005" folder in the folder tree shown in FIG. 13.

The attribute value input request unit 308 executes processing for presenting document attributes registered at the time of conversion, and prompting the user to input corresponding attribute values upon document registration.

Note that the user interfaces used in the description of this embodiment are examples, and the implementation method of the present invention is not limited to these specific interfaces. For example, character user interfaces may be used.

According to this embodiment, documents managed using normal folders and a folder tree can be easily transited to a management environment using search folders.

<Second Embodiment>

In the first embodiment, the folder tree is converted into a tree of search folders. This embodiment will explain conversion in a document management program which cannot implement a hierarchical structure of search folders. Setting windows associated with the conversion, and user's settings are the same as those in the first embodiment. Only a conversion result is different from the first embodiment. FIG. 15 shows the conversion result of the same folder tree as in the first embodiment. Differences from FIG. 13 that shows the conversion result of the first embodiment are that folders other than those of the lowermost hierarchy are not search folders but normal folders, and a search condition of each search folder of the lowermost hierarchy is defined by a logical AND of those which were the search conditions of the search folders in the upper hierarchies in FIG. 13. Compared to the first embodiment, folders of upper hierarchies are not search folders. For this reason, if a document exists immediately under an upper hierarchy folder as a conversion source, even when that document is located at the same position in a folder tree after conversion, it is not automatically classified based on its attribute but is statically associated with the folder as in before conversion. Since folders of upper hierarchies are not search folders, there is a limitation that a document that matches search conditions of only upper hierarchies is not automatically stored.

<Other Embodiments>

Note that the objects of the present invention are also achieved by supplying a computer-readable storage medium, which records a program code of software that can implement the functions of the aforementioned embodiments to a system or apparatus. Also, the objects of the present invention are achieved by reading out and executing the program code stored in the storage medium by a computer (or a CPU or MPU) of the system or apparatus.

In this case, the program code itself read out from the storage medium implements the functions of the aforementioned embodiments, and the storage medium which stores the program code constitutes the present invention.

As the storage medium for supplying the program code, for example, a flexible disk, hard disk, optical disk, magneto-optical disk, CD-ROM, CD-R, nonvolatile memory card, ROM, and the like may be used.

The computer executes the readout program code to implement the functions of the aforementioned embodiments. Also, the present invention includes a case in which an OS (operating system) running on the computer executes some or all of actual processing operations on the basis of an instruction of the program code, thereby implementing the aforementioned embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-297202, filed Nov. 15, 2007, which is hereby incorporated by references herein in its entirety.

What is claimed is:

1. A document management apparatus comprising:
a hardware processor;
a decision unit adapted to cause the processor of said document management apparatus to decide, as a document attribute, an attribute corresponding to respective hierarchies branched from one parent folder of a parent-child relationship of a folder tree as a conversion source;

an assignment unit adapted to cause the processor to assign, as an attribute value, a folder name of an upper hierarchy folder which stores each document belonging to the folder tree, to the attribute decided by said decision unit, wherein the folder name is assigned as an attribute value to an attribute corresponding to a hierarchy of the upper hierarchy folder, and wherein the folder name identifies a name of the folder which stores the respective document and does not further identify a location of the folder within the hierarchy of the folder tree;

a conversion unit adapted to cause the processor to convert each folder which configures the folder tree into a search folder which can search for documents by a search condition using the attribute decided by said decision unit and the attribute value assigned by said assignment unit, wherein the search folder includes one or more parent folders of the parent-child relationship;

a document attribute confirmation unit adapted to cause the processor to confirm whether or not an attribute of existing attributes set for documents included in respective hierarchies of the folder tree can be set as an attribute of documents to be stored in the search folder;

a document attribute selection unit adapted to cause the processor to select the existing attribute based on a confirmation result of said document attribute confirmation unit; and a document attribute processing branch unit adapted to cause the processor to accept a selection as to whether a new attribute is decided by said decision unit or the existing attribute is used by said document attribute selection unit, wherein said assignment unit assigns an attribute value to the attribute of each document which belongs to the folder tree, based on the selection accepted by said document attribute processing branch unit.

2. The apparatus according to claim 1, further comprising:
a conversion folder group designation unit adapted to cause the processor to designate a partial configuration of the folder tree as a conversion target.

3. The apparatus according to claim 1, further comprising:
an attribute value input request unit adapted to cause the processor to request to input an attribute value of the attribute decided by said decision unit upon registering a new document.

4. A document management method comprising:
a decision step of deciding, as a document attribute, an attribute corresponding to respective hierarchies branched from one parent folder of a parent-child relationship of a folder tree as a conversion source;

an assignment step of assigning, as an attribute value, a folder name of an upper hierarchy folder which stores each document belonging to the folder tree, to the attribute decided in the decision step, wherein the folder name is assigned as an attribute value to an attribute corresponding to a hierarchy of the upper hierarchy folder, and wherein the folder name identifies a name of the folder which stores the respective document and does not further identify a location of the folder within the hierarchy of the folder tree;

a conversion step of converting each folder which configures the folder tree into a search folder which can search for documents by a search condition using the attribute decided in the decision step and the attribute value assigned in the assignment step, wherein the search folder includes one or more parent folders of the parent-child relationship;

a document attribute confirmation step of confirming whether or not an attribute of existing attributes set for documents included in respective hierarchies of the folder tree can be set as an attribute of documents to be stored in the search folder;

a document attribute selection step of selecting the existing attribute based on a confirmation result in the document attribute confirmation step; and a document attribute processing branch step of accepting a selection as to whether a new attribute is decided in the decision step or the existing attribute is used in document attribute selection step, wherein an attribute value is assigned to the attribute of each document which belongs to the folder tree, based on the selection accepted in the document attribute processing branch step.

5. The method according to claim 4, further comprising:
a conversion folder group designation step of designating a partial configuration of the folder tree as a conversion target.

6. The method according to claim 4, further comprising:
an attribute value input request step of requesting to input an attribute value of the attribute defined in the document attribute definition step upon registering a new document.

7. A non-transitory computer-readable storage medium storing a program for making a computer execute a document processing method according to claim 4.

* * * * *